(12) United States Patent
Endo et al.

(10) Patent No.: US 6,950,226 B2
(45) Date of Patent: Sep. 27, 2005

(54) PROCESS FOR PRODUCING ELECTROPHORETIC DISPLAY DEVICE

(76) Inventors: Taro Endo, c/o Canon Kabushiki Kaisha 3-30-2 Shimomaruko, Ohta-ku, Tokyo (JP); Tsutomu Ikeda, c/o Canon Kabushiki Kaisha 3-30-2 Shimomaruko, Ohta-ku, Tokyo (JP)

(*) Notice: Subject to any disclaimer, the term of this patent is extended or adjusted under 35 U.S.C. 154(b) by 0 days.

(21) Appl. No.: 10/804,246

(22) Filed: Mar. 18, 2004

(65) Prior Publication Data

US 2004/0223209 A1 Nov. 11, 2004

(30) Foreign Application Priority Data

Mar. 19, 2003 (JP) .................................. 2003-076308

(51) Int. Cl.[7] .......................... G02B 26/00; G03B 15/22
(52) U.S. Cl. ...................................... 359/296; 359/253
(58) Field of Search ............................. 359/296, 253, 359/265; 204/600, 622; 345/107

(56) References Cited

U.S. PATENT DOCUMENTS 6,525,865 B2    2/2003  Katase ..................... 359/296

2004/0032389 A1 * 2/2004  Liang et al. ................ 345/107

* cited by examiner

Primary Examiner—Scott J. Sugarman
Assistant Examiner—Richard Hanig

(57) ABSTRACT

An electrophoretic display device including first and second substrates disposed with a predetermined spacing, a partition member disposed between the first and second substrates, a plurality of electrophoretic particles and an insulating liquid which are sealed up by the substrates and the partition member, and first and second electrodes disposed close to the insulating liquid, is produced through a production process comprising the following steps (A), (B), (C) and (D): (A) a step of filling the insulating liquid and the electrophoretic particles in a recess defined by the first substrate and the partition member, (B) a step of placing a first area of the second substrate to be in contact with the partition member in an uncured state and a second area of the second substrate to be in contact with the insulating liquid in a cured state, (C) a step of causing the first area of the second substrate to contact the partition member and the second area of the second substrate to contact the insulating liquid, and (D) a step of curing the first area of the second substrate contacting the partition member.

4 Claims, 3 Drawing Sheets

PROCESS FOR PRODUCING ELECTROPHORETIC DISPLAY DEVICE

FIELD OF THE INVENTION AND RELATED ART

The present invention relates to a production process of an electrophoretic display device for effecting display by moving electrophoretic particles (charged particles).

In recent years, studies on electrophoretic display devices which effect display on the basis of movement of electrophoretic particles under voltage application have been made extensively.

This type of the electrophoretic display device includes a pair of substrates disposed with a predetermined spacing, a plurality of electrophoretic particles and an insulating liquid which are disposed between these substrates, and a pair of electrodes disposed close to the insulating liquid. Compared with a liquid crystal device, the electrophoretic display device has various features such that it has a high contrast, a wide viewing angle and a memory characteristic on display, and eliminates the need for a backlight and a polarizing plate.

Assuming that the electrophoretic particles can be moved infinitely along a substrate surface in the electrophoretic display device, a deterioration in display image is caused to occur due to a distribution of the electrophoretic particles. Therefore, it is necessary to limit a movable area of the electrophoretic particles. For this reason, a partition member has been disposed between the pair of substrates so as to limit the movable area of the electrophoretic particles.

In order to produce such an electrophoretic display device, a production process including the following steps i) to iv), as described in U.S. Pat. No. 6,525,865, has been used.

i) a step of forming a partition member on one of substrates, ii) a step of mixing a sealing material (which has a specific gravity lower than the insulating liquid and is readily separated from the insulating liquid) in the insulating liquid and the electrophoretic particles, iii) a step of filling the mixture in each pixel on the substrate according to an ink jet scheme, and iv) a step of curing the sealing material when the sealing material is separated from the insulating liquid and disposed to cover the insulating liquid, thus sealing up the insulating liquid and the electrophoretic particles.

In such a sealing step of the conventional electrophoretic display device, the electrophoretic particles are adsorbed by the sealing material at the time of curing. As a result, a display quality has been lowered in some cases.

SUMMARY OF THE INVENTION

An object of the present invention is to provide a production process of an electrophoretic display device which prevents a lowering in display quality.

According to the present invention, there is provided a process for producing an electrophoretic display device comprising first and second substrates disposed with a spacing, a partition member disposed between the first and second substrates, a plurality of electrophoretic particles and an insulating liquid which are sealed up by the substrates and the partition member, and first and second electrodes disposed close to the insulating liquid, said process comprising the following steps (A), (B), (C) and (D):

(A) a step of filling the insulating liquid and the electrophoretic particles in a recess defined by the first substrate and the partition member, (B) a step of placing a first area of the second substrate to be in contact with the partition member in an uncured state and a second area of the second substrate to be in contact with the insulating liquid in a cured state, (C) a step of and causing the first area of the second substrate to contact the partition member and the second area of the second substrate to contact the insulating liquid, and (D) a step of curing the first area of the second substrate contacting the partition member.

According to the production process of the present invention, the second area contacts the insulating liquid in a cured state, so that it is possible to prevent the electrophoretic particles in the insulating liquid from being adsorbed by the second substrate. As a result, it becomes possible to suppress a lowering in display quality caused by the particle adsorption.

DETAILED DESCRIPTION OF THE PREFERRED EMBODIMENTS

Hereinbelow, the present invention will be described with reference to the drawings.

Figure 3:
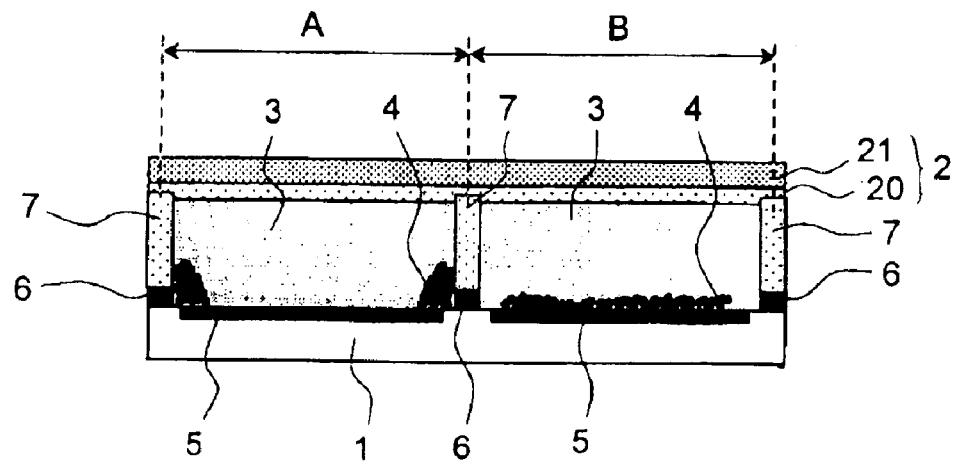
FIGS. 3, 4 and 5 are respectively a sectional view showing an embodiment of a structure of an electrophoretic display device to be produced by the production process of the present invention.

An electrophoretic display device produced through the production process according to the present invention includes, as shown in FIG. 3, a first substrate 1 and a second substrate 2 disposed with a predetermined spacing, a plurality of electrophoretic particles 4 and an insulating liquid 3 which are disposed between these substrates 1 and 2, and a first electrode 5 and a second electrode 6 which are disposed close to the insulating liquid 3. The electrophoretic display device effects display on the basis of movement of the electrophoretic particles 4 on the first electrode 5 side or the second electrode 6 side by applying a voltage between the first and second electrodes 5 and 6.

At the spacing between the first and second substrates 1 and 2, a partition member 7 for partitioning the spacing is disposed. The insulating liquid 3 and the electrophoretic particles 4 are sealed up by these substrates 1 and 2 and the partition member 7. The partition member shown in FIG. 3 is disposed to divide the spacing into two pixels A and B on one pixel basis. However, the partition member may be disposed so that one pixel (e.g., pixel A or pixel B) is further divided into two regions as shown in FIG. 4 or so that the spacing is divided on a plural pixel basis, i.e., a plural pixels are disposed between adjacent two partition members 7.

In the case where the spacing is partitioned by the partition member 7 on one pixel basis as shown in FIG. 3, it is possible to prevent movement of the electrophoretic particles 4 to another pixel, so that the number of the electrophoretic particles 4 for each pixel is made equal. As a result, it becomes possible to effect high quality display. A material for the partition member 7 may be identical to that for the substrates, and may, e.g., be an acrylic photosensitive resin. The partition member 7 may be formed by any method, such as a method wherein a photosensitive resin layer is formed and subjected to light exposure and wet type development, a method wherein a separately prepared barrier wall is adhered to a substrate, or a method using a printing process. The partition member 7 may be integrally formed with the first substrate 1.

Figure 1:
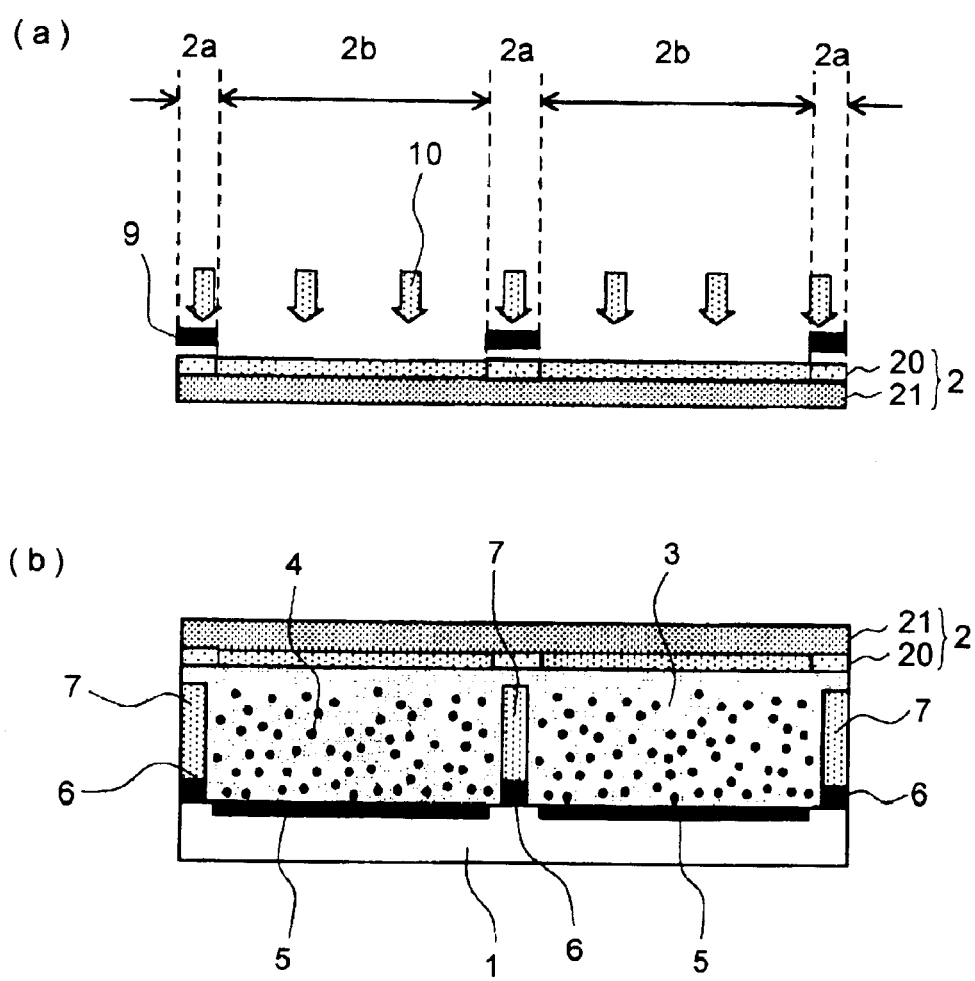
FIGS. 1(*a*) and 1(*b*) and FIGS. 2(*a*) and 2(*b*) are respectively sectional views for illustrating an embodiment of the production process of electrophoretic display device according to the present invention.

In the electrophoretic display device produced through the production process of the present invention, the second substrate 2 can be divided into a first area 2a contacting the partition member 7 and a second area 2b contacting the insulating liquid 3 as shown in FIG. 1(a).

Figure 4:
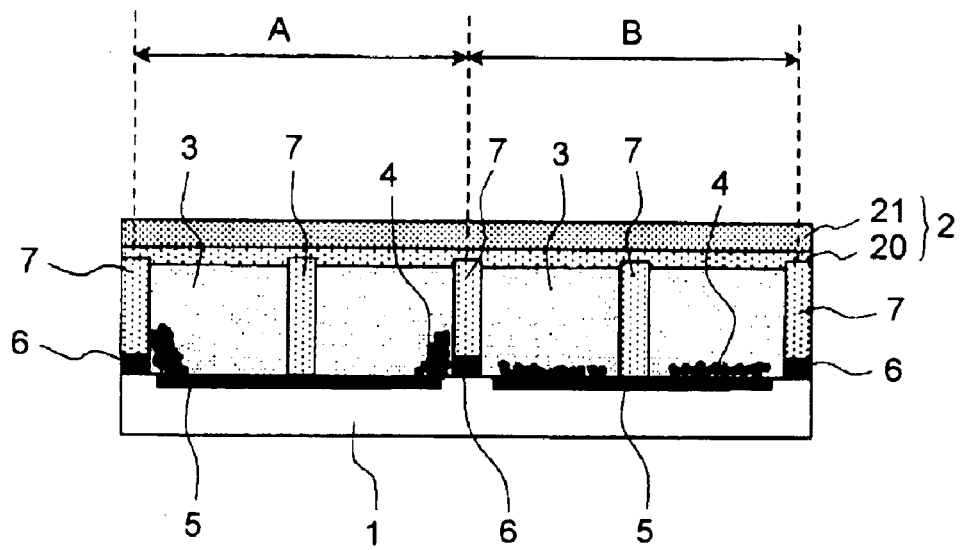

The second substrate 2 may have a lamination structure including a sealing layer 20 for sealing the insulating liquid 3 and the electrophoretic particles 4 and a support 21 for supporting the sealing layer 20 (FIGS. 1(a), 3 and 4) or a single layer structure consisting only of the sealing layer 20 for sealing the insulating liquid 3 and the electrophoretic particles 4. Even in the case of using the single layer structure consisting only of the sealing layer 20, it is necessary to keep the sealing layer 20 in a plate shape until the sealing layer 20 is completely cured. In this case, as described later, a supporting member such as the support 21 is once laminated on the sealing layer 20 until the sealing layer 21 is adhered to the partition member 7 and is peeled from the sealing layer 20 after curing the sealing layer 20 in all the areas 2a and 2b is completed. As a material for the sealing layer 20, it is necessary to use such a material that it has a low affinity for the insulating liquid 3 (and a high affinity for the support 21) and is capable of curing selectively the second area 2b and the first area 2a. As the material having a low affinity for the insulating liquid 3, it is preferable that a compound having at least one group selected from —O—, —CH$_2$—O—, and —OH is used. The compound may have a polyethylene glycol unit including repetitive —CH$_2$—CH$_2$—O— linkages. The curing method of the material for the sealing layer 20 is not particularly limited. For example, it is possible to employ a (meth-)acrylate compound having an ultraviolet curable structure, such as 2-hydroxyethyl methacrylate, 1,4-butanedioldiglycidylether diacrylate or polyethyleneglycol monomethacrylate. Further, the curable compound for the sealing layer 20 may be a polymerizable monomer or a polymerizable oligomer. These monomer and oligomer may have a monofunctional group or a polyfunctional group and may be used in mixture thereof. Further, it is also possible to use a mixture of a monofunctional compound with a polyfunctional compound. In the case where the material for the sealing layer 20 has no affinity for the support 21, the material is required to be subjected to affinity-imparting treatment, such as washing treatment with oxygen plasma etc.

As the support 21 of the first substrate 1 or the second substrate 2, it is possible to use a film of plastics, such as polyethylene terephthalate (PET), 20, polycarbonate (PC) and polyether sulfone (PES); glass; quartz; etc. In the case of using a reflection type electrophoretic display device, it is necessary to use a transparent material for the substrate and the support which are disposed on a viewer side. However, the other substrate may be a colored film of polyimide (PI).

Figure 5:
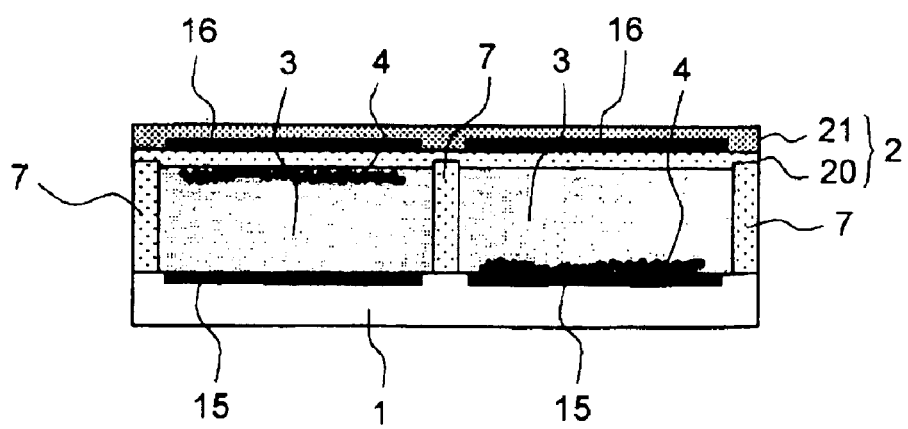

In the electrophoretic display device shown in FIG. 3, the first electrode 5 and the second electrode 6 are supported on the same substrate 1, i.e., constitute a horizontal movement type electrophoretic display device. However, in the present invention, the first electrode 5 and the second electrode 6 may be disposed on different substrates as indicated by reference numerals 15 and 16, respectively, as shown in FIG. 5, i.e., may constitute a vertical movement type electrophoretic display device.

These electrodes may preferably be formed of a patternable electroconductive material, including metals, such as titanium (Ti), aluminum (Al) and copper (Cu); carbon or silver paste; and an organic electroconductive film. In the case of preparing the reflection type electrophoretic display device, an electrode (e.g., the first electrode 5 shown in FIG. 3) disposed along a rear side substrate (i.e., a substrate opposite to the viewer side substrate) may have a function as a light reflection layer. In such a case, the electrode may preferably be formed of a material, such as silver or aluminum, having a high light reflectance. In order to effect white display by using such an electrode, the surface of the electrode may be provided with unevenness so as to permit irregular reflection of light or provided with a light scattering layer. On the other hand, the second electrode 6 shown in FIG. 3 is disposed between the partition member 6 shown in FIG. 3 is disposed between the partition member and the first substrate 1 but may be formed within the partition member 7 or disposed between the partition member 7 and the second substrate 2.

On the surfaces of these first and second electrodes, it is possible to form an insulating layer so as to ensure electrical insulation between the electrodes or prevent electric charge injection from the electrodes to the electrophoretic particles 4.

As the insulating liquid 3, a transparent nonpolar solvent such as isoparaffin, silicone oil, xylene or toluene, can be used.

As the electrophoretic particles 4, a colored material, which exhibits a good positive or negative charging characteristic in the insulating liquid 3, may be used. Examples of the material may include particles of various inorganic pigments and organic pigments; carbon black; and resinous particles containing these pigments and carbon black. The electrophoretic particles may generally have a particle size of 0.01–50 $\mu$m, preferably 0.1–10 $\mu$m.

In the insulating liquid 3 or the electrophoretic particles 4, it is possible to add a charge control agent for controlling and stabilizing the chargeability of the electrophoretic particles. Examples of the charge control agent may include monoazo dye metal complex salts, salicylic acid, organic quaternary ammonium salts, and nigrosine based compounds.

In the insulating liquid 3, a dispersing agent, for preventing mutual agglomeration of the electrophoretic particles 4 and retaining a dispersion state, may be added. As the dispersing agent, it is possible to use phosphoric acid polyvalent metal salts, such as calcium phosphate and magnesium phosphate; carbonates such as calcium carbonate; other inorganic salts; inorganic oxides; and organic polymeric materials.

In the case of effecting display by using the above-described electrophoretic display device, it is necessary to appropriately effect coloring of the electrophoretic particles 4 and other members. For example, in the horizontal movement type electrophoretic display device as shown in FIGS. 3 and 4, it is necessary to color the first electrode 5 arranged area and the electrophoretic particles 4 mutually different colors. As a method of coloring the area in which the first electrode 5 is disposed, it is possible to use a method wherein the first electrode 5 per se is colored or a method wherein a colored layer is disposed in an area where the first electrode 5 is disposed (upper or lower side of the electrode). When the electrophoretic particles 4 are black, the first electrode 5 arranged area may be colored white but may be colored another color. It is also possible to effect color display by coloring adjacent pixels red, green and blue.

Figure 2:
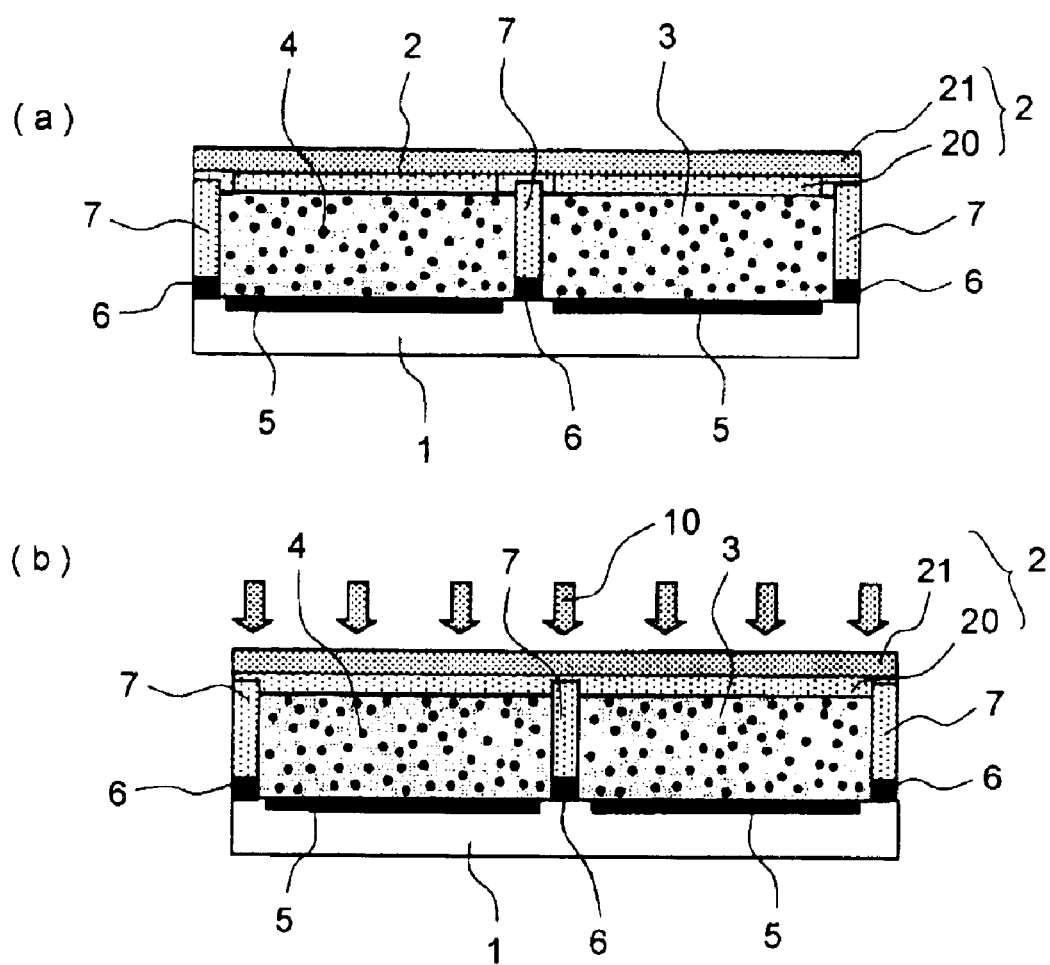

The production process of electrophoretic display device according to the present invention includes at least the following steps (1) to (4):

(1) a step of filling the insulating liquid 3 and the electrophoretic particles 4 in a recess formed by the first substrate 1 and the partition member 7, (2) a step of placing the second area 2b of the second substrate 2 in a cured state while retaining the first area 2a of the second substrate 2 in an uncured state (FIG. 1(a)), (3) a step of bonding the second substrate 2 so that the first area 2a contacts the partition member 7 in the uncured state and the second area 2b contacts the insulating liquid 3 in the cured state (FIGS. 1(b) and 2(a)), and (4) a step of curing the first area 2a contacting the partition member 7 so that the second substrate 2 is bonded to the partition member 7 to seal up the insulating liquid 3 and the electrophoretic particles 4 (FIG. 2(b)).

In the case where the horizontal movement type electrophoretic display device as shown in FIG. 3 is produced, the first electrode 5 and the second electrode 6 may preferably be formed on the first substrate 1 before filling the insulating liquid 3 and the electrophoretic particles 4. On the other hand, in the case of producing the vertical movement type electrophoretic display device as shown in FIG. 5, before filling the insulating liquid 3 and the electrophoretic particles 4, the first electrode 15 is formed on the first substrate 1 and the second electrode 16 is formed on the second substrate 2.

Further, the second area 2b can be selectively cured through any method. For example, in the case where the sealing layer 20 is formed of an ultraviolet curable resin, a mask 9 is disposed to cover only the first area 2a and the sealing layer is irradiated with ultraviolet rays 10 (FIG. 1(a)). As the mask 9, it is possible to use, e.g., a photomask for use in lithography.

According to this embodiment of the second area 2b contacts the insulating liquid 3 in a cured state, so that it is possible to prevent the electrophoretic particles 4 in the insulating liquid 3 from being adsorbed by the sealing layer 20. As a result, a lowering in display quality can be prevented.

Further, the sealing can be performed in such a state that the uncured curable resin contacts the partition member 7. As a result, it is possible to attain a good display quality.

Hereinbelow, the present invention will be described based on a specific example.

EXAMPLE 1

An electrophoretic display device shown in FIG. 3 was produced and driven.

The electrophoretic display device had 200×200 pixels each having a size of 100 $\mu$m×100 $\mu$m. A 1.1 mm-thick glass plate was used as a first substrate 1, and a partition member 7 was disposed at a boundary of each pixel. The partition member 7 had a width of 5 $\mu$m and a height of 18 $\mu$m. A first electrode 5 was disposed at a central portion of each pixel so as to have a width of 80 $\mu$m and a height of 0.1 $\mu$m. A second electrode 6 was disposed at a pixel boundary between the partition member 7 and the first substrate 1 so as to have a width of 5 $\mu$m and a height of 0.1 $\mu$m.

The electrophoretic display device was produced in the following manner.

On the first substrate 1, an aluminum film was formed and patterned through photolithography and wet etching to form the first electrode 5. On the surface of the first electrode 5, an acrylic resin layer containing titanium oxide (not shown) was formed.

On the first substrate 1, a titanium film was formed and patterned through photolithography and dry etching to form the second electrode 6. On the surface of the second electrode 6, a dark black resin film was patterned through photolithography. Further, a photosensitive epoxy resin was applied and subjected to light exposure and wet development to form the partition member 7.

Then, a recess defined by the partition member 7 was filled with the insulating liquid 3 and the electrophoretic particles 4. The insulating liquid 3 was comprised of isoparaffin (trade name: "ISOPAR", mfd. by Exxon Corp.). The electrophoretic particles 4 was comprised of styrene-methyl methacrylate copolymer containing carbon black and had a particle size of 1–2 $\mu$m. In isoparaffin (insulating liquid 3), succinimide (trade name: "OLOA 1200", mfd. by Chevron Corp.) contained as a charge control agent.

On the other hand, a curable resin layer (sealing layer 20) comprising a mixture principally containing polyethylene glycol methacrylate was applied onto a 25 $\mu$m-thick polyethylene terephthalate film (support 21).

Thereafter, as shown in FIG. 1(a), a first area 2a of the curable resin layer 20 is covered with a mask 9 and the curable resin layer 20 was subjected to irradiation with ultraviolet rays for 2 minutes at an intensity of 0.3 mW/cm$^2$ in a nitrogen environment at room temperature, thus effecting curing of the second area 2b.

Then, the support 21 and the curable resin layer 20 were pressed against the first substrate 1 at a pressure of 0.3 MPa so that the first area 2a contacted the partition member 7 and the second area 2b contacted the insulating liquid 3 (FIGS. 1(b) and 2(a)), followed by ultraviolet irradiation for 2 minutes at an intensity of 0.3 mW/cm$^2$ at room temperature to cure the first area 2a of the curable resin layer 20. To the resultant structure, a voltage application circuit (not shown) was connected, thus preparing an electrophoretic display device.

When the electrophoretic display device was driven under conditions including a drive voltage consisting of Vd1 (applied to the first electrode 5) of +50 V and Vd2 (applied to the second electrode 6) of 0 V or a drive voltage consisting of Vd1 of −50 V and Vd2 of 0 V, and a voltage application time of 100 ms, the electrophoretic particles 4 are moved without remaining on the electrode (to which the electrophoretic particles 4 were attached before the drive voltage application), thus providing a good driving characteristic.

At the second area 2b of the curable resin layer 20, the electrophoretic particles 4 were not fixed and there were no electrophoretic particles 4 which could not electrophoretically migrate, so that a good contrast was attained. Further, the electrophoretic particles 4 at a pixel were not moved to adjacent pixels by getting over the partition member 7, so that a complete sealing state was confirmed.

What is claimed is:

1. A process for producing an electrophoretic display device comprising first and second substrates disposed with a predetermined spacing, a partition member disposed between the first and second substrates, a plurality of electrophoretic particles and an insulating liquid which are sealed up by the substrates and the partition member, and first and second electrodes disposed close to the insulating liquid, said process comprising the following steps (A), (B), (C) and (D):

(A) a step of filling the insulating liquid and the electrophoretic particles in a recess defined by the first substrate and the partition member, (B) a step of placing a first area of the second substrate to be in contact with the partition member in an uncured state and a second area of the second substrate to be in contact with the insulating liquid in a cured state, (C) a step of causing the first area of the second substrate to contact the partition member and the second area of the second substrate to contact the insulating liquid, and (D) a step of curing the first area of the second substrate contacting the partition member.

2. A process according to claim 1, wherein in said step (B), the first area of the second substrate comprises an ultraviolet curable resin in an uncured state and the second area of the second substrate comprises an ultraviolet curable resin in a cured state.

3. A process according to claim 2, wherein each of the ultraviolet curable resins is an acrylate compound having an ultraviolet polymerizable structure or a methacrylate compound having an ultraviolet polymerizable structure.

4. A process according to claim 1, wherein said step (D) further includes a step of irradiating the second substrate with ultraviolet rays.

* * * * *